Oct. 9, 1934.  W. HARPER, JR  1,976,257
LAMINATED BODY AND METHOD OF MAKING SAME
Filed March 12, 1930  2 Sheets-Sheet 1
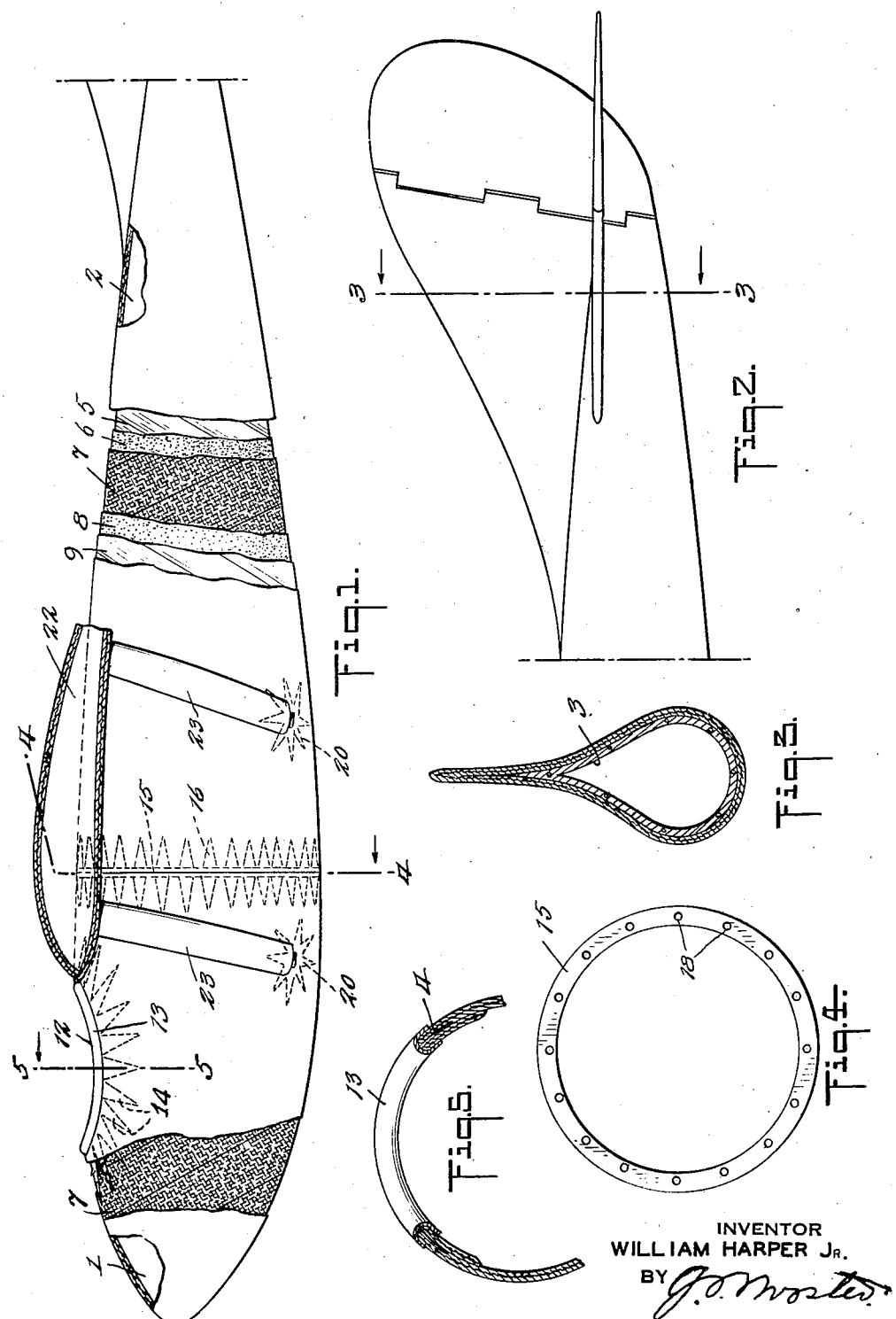
INVENTOR
WILLIAM HARPER Jr.
BY
ATTORNEY Oct. 9, 1934.  W. HARPER, JR  1,976,257
LAMINATED BODY AND METHOD OF MAKING SAME
Filed March 12, 1930  2 Sheets-Sheet 2

INVENTOR
WILLIAM HARPER Jr.
BY
ATTORNEY

Patented Oct. 9, 1934

1,976,257

UNITED STATES PATENT OFFICE 1,976,257

LAMINATED BODY AND METHOD OF MAKING SAME

William Harper, Jr., Port Washington, N. Y., assignor to Super-Marine Systems, Inc., New York, N. Y., a corporation of Delaware Application March 12, 1930, Serial No. 435,150

24 Claims. (Cl. 154—2)

This invention relates to the construction of aerofoils and other hollow bodies requiring great strength and rigidity, and has for its object to provide a light laminated structure which is capable of withstanding severe stresses and may be manufactured economically in any desired shape or size.

Other objects of the invention are to provide a novel method of molding irregular bodies and especially aerofoils constructed on the stream-line principle; to construct such bodies of fibrous materials without the usual skeleton framework; and in general to enable composite laminated bodies having predetermined uniform characteristics to be produced in large quantities with substantial savings in cost.

With the increasing trend toward metal bodies and skeleton structures in aerofoils the chief concern of workers in this field has been the solution of intricate engineering problems involving the strength of materials, beams, joints, etc., and their resistance to tension and compression, with little or no regard to cost or efficient quantity production.

The chief concern of the present invention is to eliminate such metal bodies and frameworks and the technical problems incident to their construction, and to provide molded fibrous bodies, wings and other aerofoils which may be produced economically in large quantities and are comparable with any previous structure on a weight-strength basis.

While the invention is useful in numerous situations outside the field of aeronautics I shall describe its particular application to aerofoils where the prevalent stream-line construction presents special problems. In this and other cases I mold the bodies on forms of any desired shape or size, uniting superimposed layers of fibrous materials whose characteristics are determined in advance, making it easy to maintain a given standard of construction once it has been set. Where it is desirable to construct a body in two or more sections I provide a joint for assembling the sections, and also provide special terminals which are anchored in the body for connecting the wings or other parts thereto.

The composition of the molded body may vary with different structures or the use to which they are put. In constructing a mono-cock for light small-power craft I employ a base of woven straw rattan or the like which is wrapped on the form in overlapping spiral fashion between layers of wood fibre cement covered by a facing of closely woven cloth, the whole being compressed into a compact integral structure by the matrix of the mold. The product is a strong, durable shell-like structure molded in graceful stream-line curves and constructed of material which dampens all detrimental vibrations.

The invention will be described in connection with one particular embodiment shown in the accompanying drawings, in which:

Fig. 1 is a side elevation showing the preferred method of constructing an airplane fuselage of the mono-cock type;

Fig. 3 is a section on the line 3—3 of Fig. 2, showing the method of molding the tail portion over a collapsible form;

Fig. 4 is a section on the line 4—4 of Fig. 1, showing a terminal plate for joining the two halves of the molded structure;

Fig. 5 is a section on the line 5—5 of Fig. 1, showing the reinforcement at the edge of the cock-pit;

Fig. 7 is a longitudinal section showing the several layers united as in Fig. 6 before being compressed in the mold;

Figure 2:
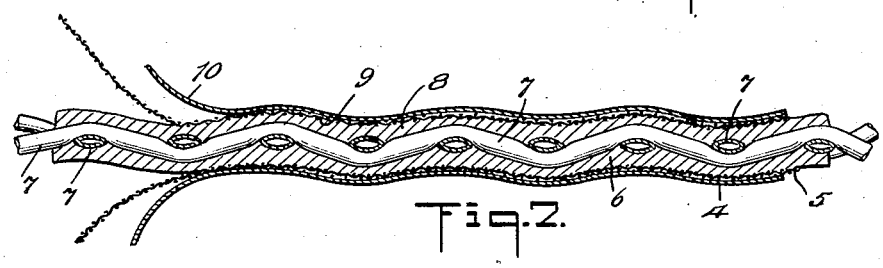
Fig. 2 is a similar view showing the construction of the tail portion.

Figs. 1 to 3 show my preferred method of constructing a mono-cock in two parts, and for this purpose I employ a separable form comprising rigid sections 1 and 2 for the main body and a collapsible section 3 for the tail portion. By making the section 3 collapsible it is possible to mold the flared tail as an integral part of the rear body portion without encountering difficulty in withdrawing it from the form when completed.

Figure 6:
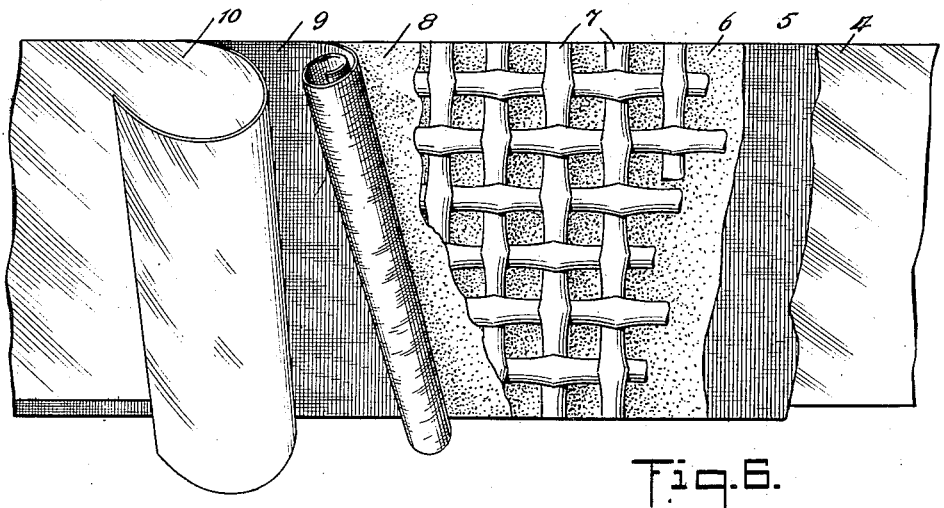
Fig. 6 is a perspective view of the composite structure with portions broken away and laid back to show details of construction.

The form assembled in the manner described is first covered with a layer of paper which is paraffined on both sides, and a layer of closely woven cloth. The paper and cloth are preferably in the form of bands 4 and 5, respectively, which may be wrapped around the form separately if desired. I prefer, however, to press the paper and cloth together by passing them through rolls which cause the paper to adhere to the cloth, and then wrap the composite band tightly around the form with adjacent edges overlapping and the paraffined side next to the form. In such case I make the paraffined paper narrower than the cloth on one edge, as shown in Fig. 6, so that the edges of the cloth will overlap and lie cloth-to-cloth and will thus be directly united by the layer of cement which is next applied. Due to the fact that the paraffined side of the cloth is next to the form, it is possible by ironing the cloth with a hot iron to cause it to adhere even to concave portions such as the flared tail end of the form, as well as to parts of the form where it is desirable to break the continuity of the bandage for any reason. The paraffined paper being next to the form also prevents the molded body from sticking fast to the form.

A layer of plastic material 6 is next spread evenly over the cloth 5. This material is preferably wood cement consisting of balsa wood pulp mixed with a light binder. On top of this cement I wrap a band of interwoven straw or rattan 7, cover it with another layer of wood cement 8, and then apply a final wrapping of woven cloth 9 having paraffined paper 10 impressed therein as previously described.

The straw or other mat 7 is preferably composed of coarse tubular straws or reeds with the warps and wefts spaced so that their original tubular structure is not destroyed although the reeds may be compressed at their points of intersection, as shown in Figs. 6 and 7, enabling the mat to withstand both tension and compression. The mat of reeds thus constructed in the form of a bandage is preferably wrapped on the bias over the cement layer 6, as shown in Fig. 1, with the adjacent edges overlapping about an inch. If desired, the mat may be woven or cut on the bias and wrapped in simple circles or in any other manner. After the clotch 9 and paraffined paper 10 are applied the body is covered by the matrix of the mold and compressed into a compact integral structure with the cement filling the spaces between the reeds and the cloth layers 5 and 9 pressed firmly into the cement. After removing the matrix of the mold the body is slipped off the form and smoothed down and treated with any suitable fire-proofing material and other finish.

So far I have described the method of molding the body without provision for the cock-pit or other openings, or the means for connecting the separate sections together. In order to provide for the cock-pit 12 shown in Fig. 1, I form this portion of the body the same as before except that I terminate all layers of material at the line which is to define the edge of the cock-pit, cutting off the reeds and cloth and spreading the cement up to the desired line. On top of the upper layer of cloth 9 I lay a metal or other rim 13 of the desired shape having outwardly extending fins 14, fitting the rim to the edge of the cock-pit. This portion of the body is then covered with a second layer of fibrous material which is applied in the same way as before, anchoring the fins 14 between the two layers, and blending smoothly into the main body upon the application of pressure to the matrix of the mold.

Figure 8:
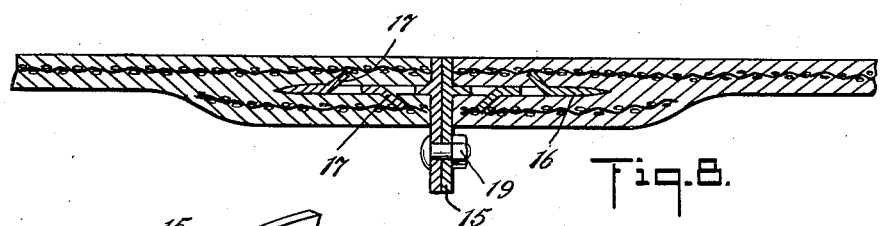
Fig. 8 is a longitudinal section showing the joints between adjacent sections anchored in the molded material.
Figure 9:
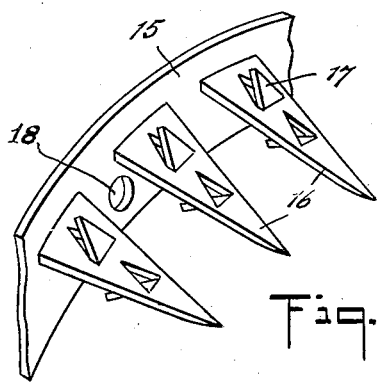
Fig. 9 is a fragmentary perspective view of the terminal plate for securing the sections together.
Figure 10:
Fig. 10 is a perspective view of a terminal adapted for securing wings and other parts to the molded body.

The joint between the two sections of the body is constructed in the manner shown in Figs. 1, 4, 8 and 9, and is preferably made at a point where the body is circular in cross-section. The joint comprises two terminal plates each having an annular flange 15 and closely spaced fins 16 having spikes 17 struck up on opposite sides thereof. After the first layer of fibrous material is applied to the form, leaving the two sections of the body disconnected, the terminal plates are fitted over the respective sections with the flanges 15 facing each other as indicated in Fig. 1. The edges of each section are then finished with another layer of cement, reeds, etc., covering the fins 16, after which the two layers are compressed and blended together in the mold with the terminal plates anchored between them as shown in Fig. 8. The flanges 15 are provided with holes 18 for the passage of rivets or bolts 19 which clamp the two sections of the body together.

Suitable terminal plates 20 may also be embedded in the body for attaching the wings or other parts thereto. These plates are provided with spiked fins similar to those described above, and have eyelets 21 or other suitable attaching means. Fig. 1 shows the method of attaching a wing 22 to the body by means of struts 23 which are fastened to spaced terminal plates 20, it being understood that the wings are also constructed in the manner described above.

It will be evident that numerous changes may be made in the details of construction herein shown and described without departing from the invention as defined in the appended claims.

The invention claimed is:

1. A composite molded body comprising partly overlapping sheets of coarsely woven rigid fibrous material completely encased in a plastic binder confined in a closely woven cover, all molded to shape and compressed into an integral rigid structure.

2. A composite molded body comprising partly overlapping sheets of interwoven reeds having substantially tubular warps and wefts encased in a plastic binder and compressed into a rigid structure.

3. A composite molded body comprising partly overlapping sheets of interwoven reeds having substantially tubular warps and wefts encased in a plastic binder confined in a closely woven cover, all molded to shape and compressed into an integral rigid structure.

4. A composite molded body comprising partly overlapping sheets of interwoven reeds having substantially tubular warps and wefts encased in wood fibre cement and compressed into a rigid structure.

5. The method of molding laminated bodies on forms which comprises covering the form with paraffined paper, wrapping closely woven fabric over the paper, covering the fabric with a plastic filler, wrapping a band of fibrous material in spiral formation over said filler with adjacent edges overlapping, covering said fibrous material with additional plastic filler, wrapping closely woven fabric over said filler, and compressing the whole into a compact structure.

6. The method of molding a plastic body on a form which comprises wrapping the form with a bandage including a layer of paraffined paper and a wider layer of cloth so that adjacent edges of the cloth overlap and lie cloth-to-cloth with the paper lying next to the form, and spreading plastic material over the cloth.

7. A pliable bandage for use in molding plastic material on a form, comprising a layer of paraffined paper and a layer of cloth enough wider than the paper to permit adjacent edges of the cloth to overlap and lie cloth-to-cloth when the bandage is wrapped over the form.

8. A pliable bandage for use in molding plastic material on a form, comprising a layer of paraffined paper and a layer of cloth which is wider on one edge than said paper so that adjacent edges of the cloth will overlap and lie cloth-to-cloth when the bandage is wrapped over the form.

9. A pliable bandage for use in molding plastic material on a form, comprising a layer of paper paraffined on both sides, and a layer of cloth compressed onto one side of said paper, the cloth being wider on one edge than the paper so that adjacent edges of the cloth will overlap and lie cloth-to-cloth when the bandage is wrapped over the form.

10. A composite molded body comprising a relatively narrow mat composed of coarse tubular reeds wrapped in the shape of the finished body with adjacent edges of the mat overlapping, and a binder covering both sides of the mat and compressed into the spaces between the reeds.

11. A composite molded body comprising a band of interwoven tubular reeds spaced to maintain their original tubular structure and wrapped in the shape of the finished body, and a binder compressed into the spaces between the reeds and uniting said reeds in a compact rigid structure.

12. A composite molded body comprisng a band of interwoven tubular reeds wrapped in the shape of the finished body with adjacent edges of the band overlapping, and a binder covering both sides of said band and compressed into the spaces between the reeds.

13. A composite molded body comprising a band of interwoven tubular reeds wrapped in the shape of the finished body with a biased web and with adjacent edges of the band overlapping, and a binder covering both sides of said band and compressed into the spaces between the reeds, the warp and weft reeds of said band being spaced to maintain their original tubular structure.

14. A composite molded body comprising a band of interwoven tubular reeds wrapped in the shape of the finished body with adjacent edges of the band overlapping, wood fibre cement covering both sides of said band and compressed into the spaces between the reeds, and layers of cloth pressed firmly into the surface of the cement on opposite sides of the reeds, the warp and weft reeds of said band being spaced to maintain their original tubular structure.

15. A composite molded body comprising a band of interwoven tubular reeds wrapped in spiral formation in the shape of the finished body with adjacent edges of the band overlapping, wood fibre cement covering both sides of said band and compressed into the spaces between the reeds, and inner and outer fabric covers pressed firmly into the cement on opposite sides of said band, the warp and weft reeds of said band being spaced to maintain their original tubular structure.

16. A composite molded body comprising a relatively narrow band of interwoven tubular reeds wrapped in the shape of the finished body with a biased web and with adjacent edges of the band overlapping, wood fibre cement covering both sides of said band and compressed into the spaces between the reeds, and inner and outer covers of closely woven cloth pressed firmly into the cement on opposite sides of said band, the warp and weft reeds of said band being spaced to maintain their original tubular structure.

17. The method of molding laminated bodies on forms which comprises spreading a plastic binder over the form, wrapping a band of interwoven tubular reeds on the bias over the binder while still plastic, covering the band with a plastic binder, and compressing the whole into a compact rigid structure with the binder filling the spaces between the interwoven reeds.

18. The method of molding laminated bodies on forms which comprises covering the form with a plastic binder, wrapping a band of interwoven tubular reeds over said binder while still plastic, with the web on the bias and with adjacent edges of the band overlapping, covering the band with a plastic binder, and compressing the whole into a compact rigid structure with the binder filling the spaces between the interwoven reeds.

19. A molded shell-like aerofoil composed of fibrous vibration-dampening material comprising a mat composed of connected reeds and a fibrous binder compressed between said reeds and uniting them into a compact rigid structure capable of withstanding tension and compression.

20. A molded shell-like aerofoil composed of fibrous vibration-dampening material comprising a mat composed of interwoven tubular reeds and a fibrous binder compressed into the spaces between said reeds and uniting said reeds into a compact rigid structure capable of withstanding tension and compression.

21. A molded shell-like aerofoil composed of fibrous vibration-dampening material comprising a mat composed of interwoven tubular reeds spaced to maintain their original tubular structure and a fibrous binder compressed into the spaces between said reeds and uniting said reeds into a compact rigid structure capable of withstanding tension and compression.

22. A molded shell-like aerofoil composed of fibrous vibration-dampening material comprising a band of interwoven tubular reeds wrapped in the shape of the aerofoil and a fibrous binder compressed into the spaces between said reeds and uniting said reeds into a compact rigid structure capable of withstanding tension and compression.

23. A molded shell-like aerofoil composed of fibrous vibration-dampening material comprising a band of interwoven tubular reeds wrapped in the shape of the aerofoil with adjacent edges of the band overlapped, and a fibrous binder compressed into the spaces between said reeds and uniting said reeds into a compact rigid structure capable of withstanding tension and compression.

24. A molded shell-like aerofoil composed of fibrous vibration-dampening material comprising a band of interwoven tubular reeds wrapped in the shape of the aerofoil with adjacent edges of the band overlapped, and a binder of wood fibre cement compressed into the spaces between said reeds and uniting said reeds into a compact rigid structure capable of withstanding tension and compression.

WILLIAM HARPER, Jr.